(12) United States Patent
Newsome

(10) Patent No.: US 7,323,702 B2
(45) Date of Patent: Jan. 29, 2008

(54) ULTRAVIOLET LIGHT WITH POLYMER CONVERSION SHEETS

(76) Inventor: Donald Ellis Newsome, 16605 127th Ave. SE., Renton, WA (US) 98058

( * ) Notice: Subject to any disclaimer, the term of this patent is extended or adjusted under 35 U.S.C. 154(b) by 547 days.

(21) Appl. No.: 11/044,867

(22) Filed: Jan. 26, 2005

(65) Prior Publication Data

US 2006/0163502 A1    Jul. 27, 2006

(51) Int. Cl.
*G02B 1/00* (2006.01)
(52) U.S. Cl. .................................. 250/504 H
(58) Field of Classification Search .............. 250/504 H
See application file for complete search history.

(56) References Cited

U.S. PATENT DOCUMENTS

| | | | |
|---|---|---|---|
| 2,324,384 A | 7/1943 | Grimes | |
| 4,420,709 A | 12/1983 | Rattray | |
| 5,211,467 A | 5/1993 | Seder | |
| 5,670,786 A | 9/1997 | Meyer et al. | |
| 5,736,744 A | 4/1998 | Johannsen et al. | |
| 5,905,268 A | 5/1999 | Garcia et al. | |
| 6,355,935 B1 | 3/2002 | Kalley et al. | |
| 6,362,488 B1 | 3/2002 | Cabrera et al. | |
| 6,670,619 B2 | 12/2003 | Waluszko | |
| 7,148,497 B2 | 12/2006 | Gardner | |
| 2002/0141176 A1 | 10/2002 | Cekic et al. | |

*Primary Examiner*—Jack I. Berman
*Assistant Examiner*—Andrew Smyth
(74) *Attorney, Agent, or Firm*—Polly L Oliver

(57) ABSTRACT

A handheld or display assembly device which allows a user to obtain UV light in varying wavelengths from a single standard short-wave (SW) ultraviolet lamp. A standard SW ultraviolet lamp that has no phosphor coating is used, and the conversion sheets with different mixtures (or compounds) of phosphor are applied to convert the SW light into a medium-wave or long-wave light. One aspect of the present invention comprises an ultraviolet lamp, a housing for said lamp, a set of conversion sheets, and holding elements for removably mounting the conversion sheets adjacent the lamp. Another embodiment comprises a continuous sheet of the conversion sheets which is configured to roll across the front of the UV lamp, thereby converting the SW light into medium-wave or long-wave light.

22 Claims, 2 Drawing Sheets

ULTRAVIOLET LIGHT WITH POLYMER CONVERSION SHEETS

FIELD OF THE INVENTION

This invention pertains generally to ultraviolet lights and more specifically to an ultraviolet light assembly with polymer conversion sheets with phosphors.

BACKGROUND OF THE FIELD

In all fluorescent lamps, the mercury arc in the lamp generates primarily short wave (SW) ultraviolet (UV) energy at approximately 253.7 nm. When a lamp is manufactured, a fluorescent phosphor is applied to coat the inside of the lamp (bulb wall), which is usually made of a soda-lime glass. When the lamp is operating, the SW ultraviolet light hits the phosphor on the inside of the lamp causing the phosphor to fluoresce in the visible spectrum that we see (usually some type of white color). The type of phosphor coating determines the color of the fluorescent light emitted.

Some special UV fluorescent type lamps, instead of having a phosphor that fluoresces primarily in the visible light (white), they have a phosphor that fluoresces primarily in another UV wavelength. These UV phosphors are of different compounds or mixtures depending on the peak UV spectral distribution output desired, e.g., 306, 312, 351, or 368 nm. Other UV spectral distributions are also available based on mixtures of the different UV phosphors.

In some special UV fluorescent lamps, the UV fluorescence will not effectively transmit through the soda-lime glass bulb, so a different, higher UV-transmitting glass is used, such as erythemal glass. Also in some UV lamps, quartz is used instead of erythemal or soda-lime glass.

For many UV fluorescent applications, a SW filter is inserted over the UV lamp to block the small amount of visible light generated by the UV arc and phosphor in the lamp. This normal SW filter has a very broad UV band-pass. It transmits most of the UV wavelengths desired but still blocks most of the visible light. Since many of the fluorescent applications are done in the dark, the small amount of visible light generated by the SW lamp would mask or override the fluorescent effect without an ultraviolet-transmitting visible-absorbing filter.

With these current devices, the only way to change wavelengths is to open up the light assembly and change the lamp bulb. Not only does this present a problem for the typical UV light user, but it necessitates that a field geologist, mineralogist, or amateur collector carries several different UV light assemblies into the field.

U.S. Pat. No. 6,670,619 to Waluszko discloses a transilluminator having conversion means held between such a SW lamp and a light-absorbing filter. However, Waluszko's conversion means are specifically a plate with a phosphor coating applied thereon. The conversion means of the current invention are polymer or plastic sheets which have the specific UV phosphor mixed in with the polymer or plastic during manufacture. The resulting conversion sheets are more lightweight and flexible than plates with coatings and are applicable to handheld devices.

SUMMARY OF THE INVENTION

The present invention solves the above-mentioned problems by providing an UV light assembly that comprises only one fluorescent lamp and several conversion sheets being held within a typically hand-held housing and which are used to convert the UV light of the lamp into any desired wavelength.

The fluorescent light assembly of the present invention comprises a standard or germicidal SW lamp that has no phosphor coating thereon (i.e., transparent tubing) and will allow the 253.7 nm wavelength generated to pass through the bulb wall. The housing is configured in such a way that the SW light from the lamp is directed through the opening on one side of the housing (typically the side opposite the handle). Then adjacent to the SW lamp is placed a special translucent polymer or plastic conversion sheet (which is also transparent to the 253.7 nm wavelength) which incorporates the specific UV phosphor therein. Unlike extant transilluminator plates, which have only coatings of phosphors, the instant conversion sheets have the specific UV phosphors dispersed evenly throughout the translucent polymer or plastic of the sheet during manufacture.

When the 253.7 nm wavelength light from the SW lamp first encounters the conversion sheet, the phosphor in the sheet will fluoresce in the desired UV wavelength. Typical peak UV wavelengths desired are 306, 312, 351, or 368 nm. Therefore, the UV phosphor chosen for the sheet will usually come from the group comprising these phosphors. Other UV spectral distributions may be available based on mixtures of different UV phosphors.

As an option, a second sheet (or a coating to the first sheet) can be applied adjacent to the conversion sheet on the side away from the lamp. This second sheet (or coating) will comprise a SW absorbing material that will absorb any 253.7 nm wavelength light that manages to leak through the conversion sheet, thereby allowing only the wavelengths generated by the UV phosphor to exit the light assembly.

As another option, an external ultraviolet-transmitting, visible-absorbing short-wave filter can be provided over or adjacent to the conversion sheet, e.g., at the opening of the housing, to block the small amount of visible light generated thereby. Such a filter would be held in place by holders therefor mounted at the opening either internally or externally to the housing.

In an alternate embodiment, the set of conversion sheets can be provided as one continuous sheet, having sections with different phosphors, which is rolled in front of the lamp. In this embodiment, the light housing would comprise supply and take-up spools for containing the rolled sheet, and the user would spool up the continuous sheet using the knobs on the exterior of the housing in order to position the desired phosphor in front of the lamp.

With this invention, the UV wavelength can be changed without having to open up the light assembly. By having only one UV light assembly according to the present invention, separate UV light assemblies for each UV wavelength will not be required by the field geologist, mineralogist, or amateur collector.

DETAILED DESCRIPTION OF THE PREFERRED EMBODIMENT

Figure 1:
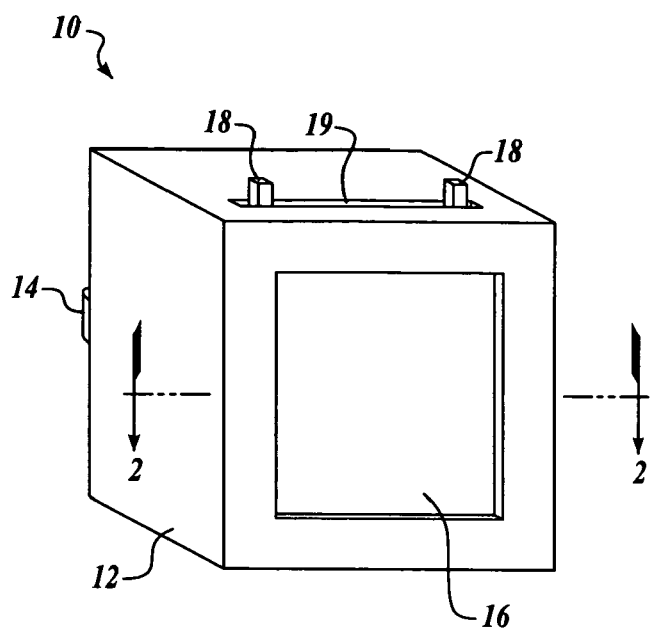
FIG. 1 is a perspective view of an embodiment of the present invention.

The housing 12 of the ultraviolet light assembly 10 shown in FIG. 1 is rectangular, although any appropriate shape would suffice. The housing 12 comprises a handle 14 and an opening 16. It is also necessary that there be external access to the slots 18 for holding the flexible conversion sheets 20 (best shown in FIG. 2) to be mounted in alternate therein. Therefore, in this FIG. 1, the slots 18 are shown extending through the top of the housing 12 through an access opening 19, but they could easily be accessed by any other appropriate means.

Figure 2:
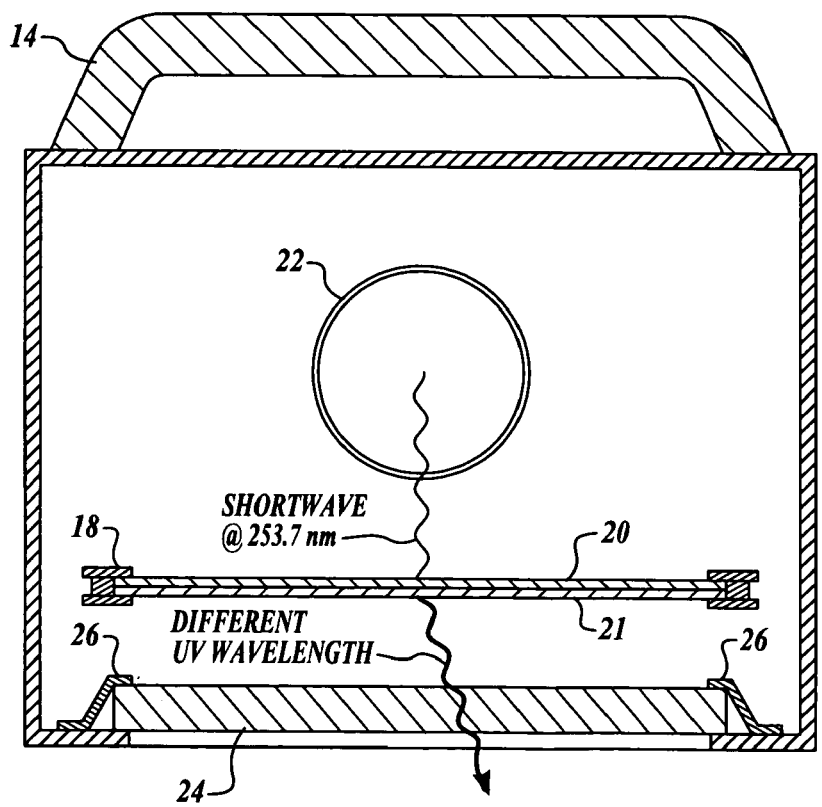
FIG. 2 is a sectional view of an embodiment of the present invention.

FIG. 2 is a sectional view of the ultraviolet light assembly 10 taken along the section lines 2-2. The short-wave germicidal lamp 22 is constructed with transparent tubing such as quartz or erythemal glass so that the short-wave light (approx. 253.7 nm) generated thereby will pass unobstructed through the bulb wall. The slots 18 (of which there are at least two, but there may be as many as are necessary for the particular design) are mounted within the housing such that they will hold a flexible conversion sheet 20 disposed between the lamp 22 and the opening 16. As an option, a coating 21 may be applied to the sheet 20 on the side directed away from the lamp. This coating comprises a SW absorbing material that will absorb any 253.7 nm wavelength light that manages to leak through the conversion sheet 20. Adjacent the opening 16, and generally parallel to the conversion sheet 20, is held an ultraviolet-transmitting visible-absorbing filter 24, typically known as a shortwave filter. The filter 24 is held in place with any appropriate holders 26 which are mounted to the interior or exterior of the housing 12. Through the access opening 19, the conversion sheets 20 can be inserted and removed, thereby placing different phosphors between the lamp and the opening for different applications of the lamp.

Figure 3:
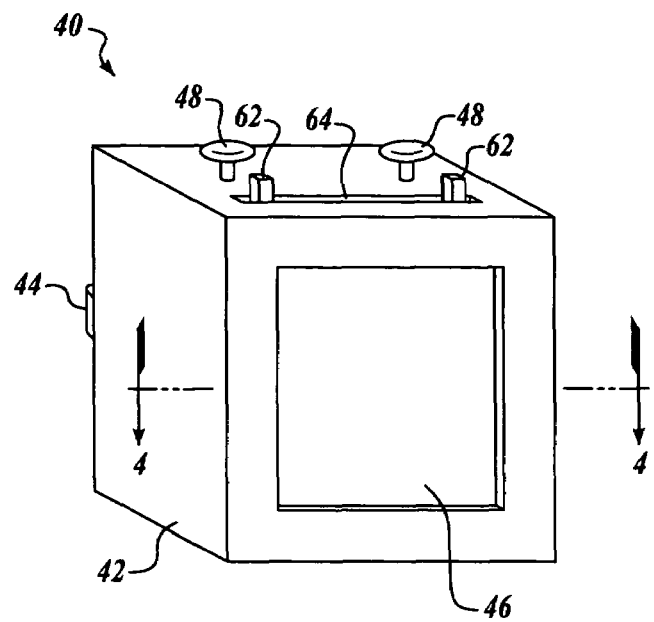
FIG. 3 is a perspective view of an alternate embodiment.

FIG. 3 represents an alternate embodiment 40 of the invention. The housing 42 is rectangular, although any appropriate shape would suffice, and comprises a handle 44 and an opening 46. The flexible conversion sheets are held as a continuous sheet 50 (best seen in FIG. 4) with varying phosphor sections mounted on two spools which are controlled by knobs 48 and which are placed on opposite sides of the opening. It is necessary that there be external access to the knobs 48 so that the user (not shown) can adjust the sheet 50 (by advancing or winding on the spools) to have the desired phosphor, or section, in front of the opening 46. So the knobs are shown as extending from the housing; however they could just as easily be recessed into the housing with the appropriate access thereto.

Figure 4:
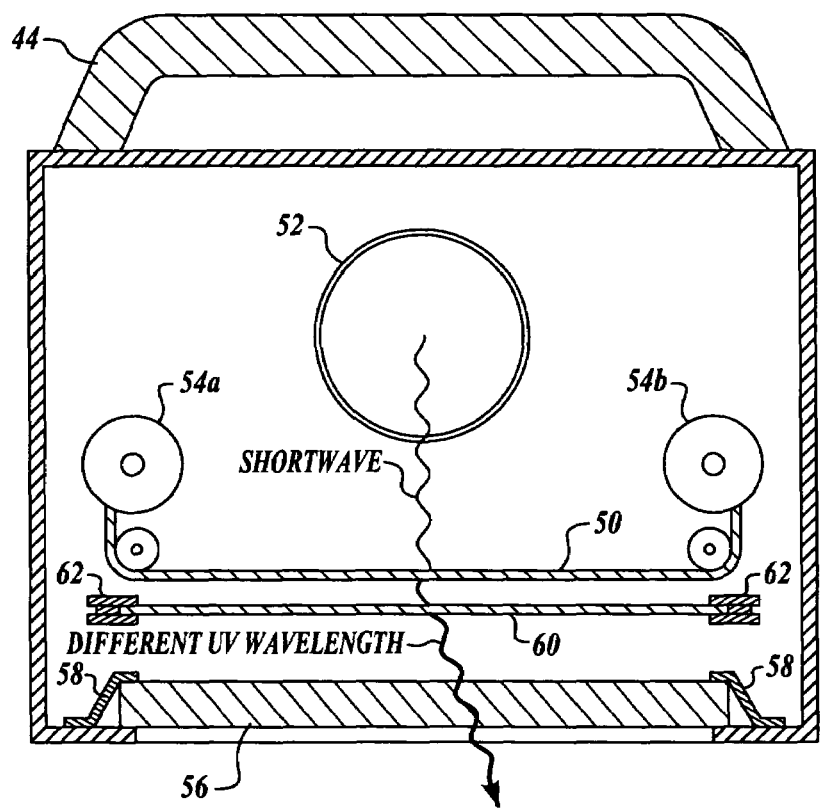
FIG. 4 is a sectional view of an alternate embodiment.

FIG. 4 is a sectional view of this alternate embodiment 40 taken along the section lines 4-4. The lamp 52 is constructed with transparent tubing such as quartz so that the short-wave light generated thereby will pass unobstructed through the bulb wall. The spools (take-up spool 54a and supply spool 54b) are mounted within the housing such that they will hold the continuous conversion sheet 50 disposed between the lamp 52 and the opening 46. As an option, a second sheet 60 may be held in place between the sheet 50 and the filter 56. This second sheet 60 comprises a SW absorbing material that will absorb any 253.7 nm wavelength light that manages to leak through the conversion sheet 50 and is an alternative to the coating 21. In this option, the second sheet 60 is held by two slots 62 that extend through an external access opening 64. Against the opening 46, and generally parallel to the conversion sheet 50, is held an ultraviolet-transmitting visible-absorbing filter 56. The filter 56 is held in place with any appropriate holders 58 which are mounted to the interior or exterior of the housing 42.

The continuous sheet may be constructed in sections, such that each section has a different phosphor mixed in with the polymer (or plastic). With this application, the user can turn the spools so as to position different phosphors over the opening, thereby obtaining different wavelengths.

What is claimed is:

1. An ultraviolet light assembly comprising:

A short-wave germicidal lamp having transparent tubing, said lamp designed to generate ultraviolet light at approximately 253.7 nm wavelength and being mounted within a housing;

Said housing for said lamp defining an opening through which shines the light from the lamp and having a plurality of holders adjacent to said opening, said housing also having at least two slots mounted between the lamp and the opening;

A plurality of flexible conversion sheets removably mounted in alternate within said slots, each one of said sheets comprising a translucent polymer mixed with at least one specific ultraviolet phosphor dispersed evenly throughout;

Said housing further defining a handle and an access opening for insertion and removal of said conversion sheets; and A shortwave filter mounted within said holders adjacent said opening.

2. The assembly of claim 1 wherein the lamp tubing material is chosen from the group comprising quartz and erythemal glass.

3. The assembly of claim 1 wherein the ultraviolet phosphor of each conversion sheet is chosen from the group comprising phosphors that fluoresce with a peak at 306 nm, 312 nm, 351 nm, and 368 nm wavelengths.

4. The assembly of claim 1 further comprising a short-wave-absorbing coating applied to the conversion sheet on the side directed away from the lamp.

5. The assembly of claim 1 further comprising a second sheet comprising a short-wave-absorbing material which is mounted adjacent the conversion sheet on the side directed away from the lamp.

6. An ultraviolet light assembly comprising:

A short-wave germicidal lamp having transparent tubing, said lamp designed to generate ultraviolet light at approximately 253.7 nm wavelength and being mounted within a housing;

Said housing for said lamp defining an opening through which shines the light from the lamp and having a plurality of holders adjacent to said opening, said housing also having at least two slots mounted between the lamp and the opening;

A plurality of flexible conversion sheets removably mounted in alternate within said slots, each of said sheets comprising a translucent plastic and at least one specific ultraviolet phosphor dispersed evenly throughout;

Said housing further defining a handle and an access opening for insertion and removal of said conversion sheets; and A shortwave filter mounted within said holders adjacent said opening.

7. The assembly of claim 6 wherein the lamp tubing material is chosen from the group comprising quartz and erythemal glass.

8. The assembly of claim 6 wherein the ultraviolet phosphor of the conversion sheet is chosen from the group comprising phosphors that fluoresce with a peak at 306 nm, 312 nm, 351 nm, and 368 nm wavelengths.

9. The assembly of claim 6 further comprising a short-wave-absorbing coating applied to the conversion sheet on the side directed away from the lamp.

10. The assembly of claim 6 further comprising a second sheet comprising a short-wave-absorbing material which is mounted adjacent the conversion sheet on the side directed away from the lamp.

11. An ultraviolet light assembly comprising:
   A short-wave germicidal lamp having transparent tubing, said lamp designed to generate ultraviolet light at approximately 253.7 nm wavelength and being mounted within a housing;
   Said housing for said lamp defining an opening through which shines the light from the lamp and having a supply spool and a take-up spool on opposite sides thereof and disposed between the lamp and the opening; said housing also comprising a handle and a plurality of holders mounted on the housing adjacent said opening and a short-wave filter mounted within said holders; and
   A continuous flexible conversion sheet wound upon said spools such that the sheet is disposed between the lamp and the opening, said sheet comprising a translucent polymer mixed with at least one specific ultraviolet phosphor dispersed evenly throughout.

12. The assembly of claim 11 wherein the lamp tubing material is chosen from the group comprising quartz and erythemal glass.

13. The assembly of claim 11 wherein the ultraviolet phosphor of the conversion sheet is chosen from the group comprising phosphors that fluoresce with a peak at 306 nm, 312 nm, 351 nm, and 368 nm wavelengths.

14. The assembly of claim 11 further comprising a short-wave-absorbing coating applied to the conversion sheet on the side directed away from the lamp.

15. The assembly of claim 11 further comprising a second sheet comprising a short-wave-absorbing material which is mounted adjacent the conversion sheet on the side directed away from the lamp.

16. The assembly of claim 11 wherein the conversion sheet comprises a plurality of sections, each section having a different phosphor mixed therein.

17. An ultraviolet light assembly comprising:
   A short-wave germicidal lamp having transparent tubing, said lamp designed to generate ultraviolet light at approximately 253.7 nm wavelength and being mounted within a housing;
   Said housing for said lamp defining a handle and an opening through which shines the light from the lamp and having a supply spool and a take-up spool on opposite sides thereof and disposed between the lamp and the opening; said housing also comprising a handle and a plurality of holders mounted on the housing adjacent said opening and a short-wave filter mounted within said holders; and
   A continuous flexible conversion sheet wound upon said spools such that the sheet is disposed between the lamp and the opening, said sheet comprising a translucent plastic mixed with at least one specific ultraviolet phosphor dispersed evenly throughout.

18. The assembly of claim 17 wherein the lamp tubing material is chosen from the group comprising quartz and erythemal glass.

19. The assembly of claim 17 wherein the ultraviolet phosphor of the conversion sheet is chosen from the group comprising phosphors that fluoresce with a peak at 306 nm, 312 nm, 351 nm, and 368 nm wavelengths.

20. The assembly of claim 17 further comprising a short-wave-absorbing coating applied to the conversion sheet on the side directed away from the lamp.

21. The assembly of claim 17 further comprising a second sheet comprising a short-wave-absorbing material which is mounted adjacent the conversion sheet on the side directed away from the lamp.

22. The assembly of claim 17 wherein the conversion sheet comprises a plurality of sections, each section having a different phosphor mixed therein.

* * * * *